United States Patent [19]

Sudo

[11] Patent Number: 4,470,220

[45] Date of Patent: Sep. 11, 1984

[54] DEVICE FOR OPENING AND CLOSING A SWINGABLY MOUNTED LID

[75] Inventor: Yusuke Sudo, Yokohama, Japan

[73] Assignee: Victor Company of Japan, Limited, Yokohama, Japan

[21] Appl. No.: 202,657

[22] Filed: Oct. 31, 1980

[30] Foreign Application Priority Data

Nov. 2, 1979 [JP] Japan .......................... 54-152829[U]

[51] Int. Cl.³ .............................................. E05F 1/00
[52] U.S. Cl. ....................................... 49/379; 49/386; 220/264
[58] Field of Search .................. 49/335, 337, 386, 379; 220/246, 264, 292; 74/2

[56] References Cited

U.S. PATENT DOCUMENTS 768,869  8/1904  Symons ................................. 49/379
1,594,219  7/1926  Stockstrom ....................... 49/386 X

FOREIGN PATENT DOCUMENTS 1459042  1/1969  Fed. Rep. of Germany ........ 49/390

Primary Examiner—Kenneth Downey
Attorney, Agent, or Firm—Lowe, King, Price & Becker

[57] ABSTRACT

A first gear is fixedly connected to the rotary shaft of a swingably mounted lid, and is engaged with a second gear which is rotatably mounted on a stationary member. The second gear is biased by means of a spring in such a direction that the lid tends to swing open, while a ratchet portion having a recess is provided at a peripheral portion thereof. A pawl is arranged to engage with the recess to stop the rotation of the second gear, and is arranged to disengage with the recess to release the second gear when intended to open the lid. A brake member is interposed between the stationary member and the second gear to prevent the lid from rapid opening. The pawl may be manually disengaged from the recess by depressing a push-button operatively connected thereto. Such a push-button may be omitted if the shape of the recess is arranged to easily disengage from the pawl when the lid is pulled manually.

25 Claims, 8 Drawing Figures

FIG. 1 PRIOR ART
FIG. 2 PRIOR ART
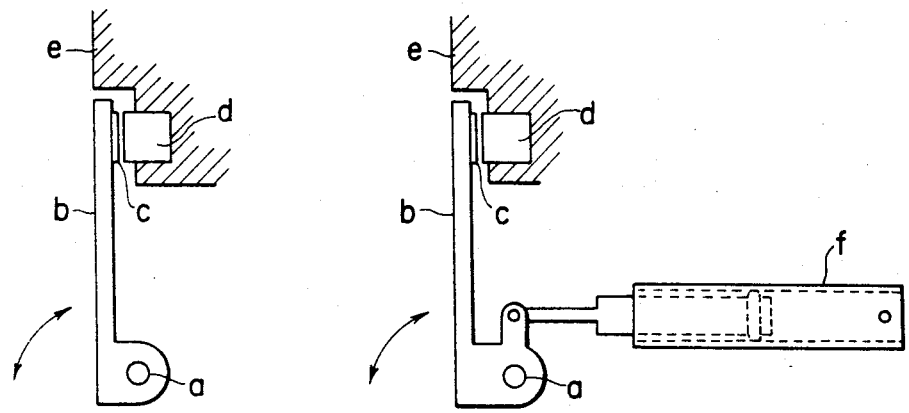
FIG. 3
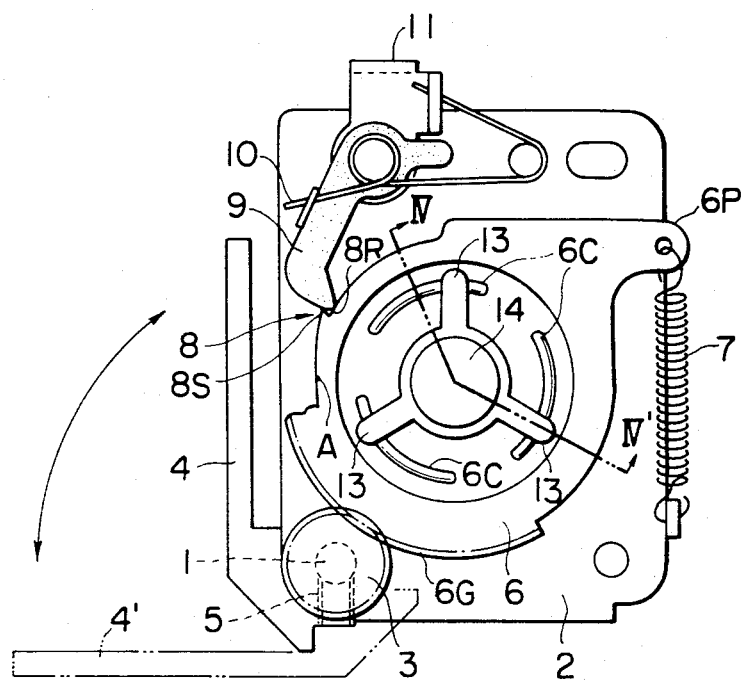

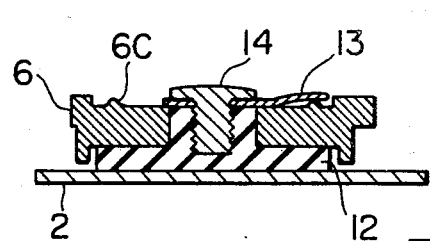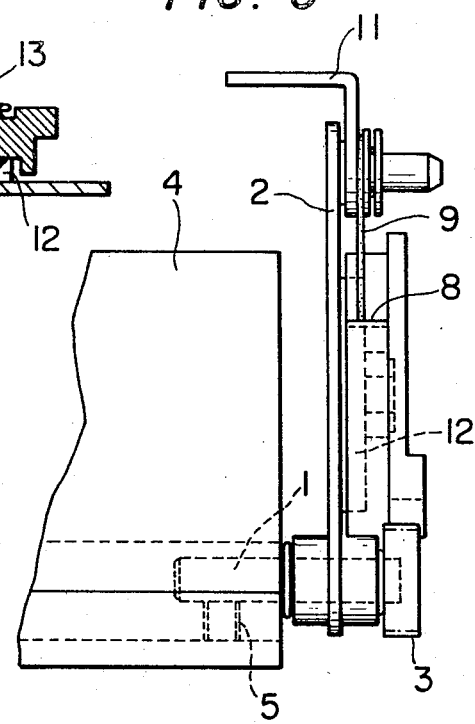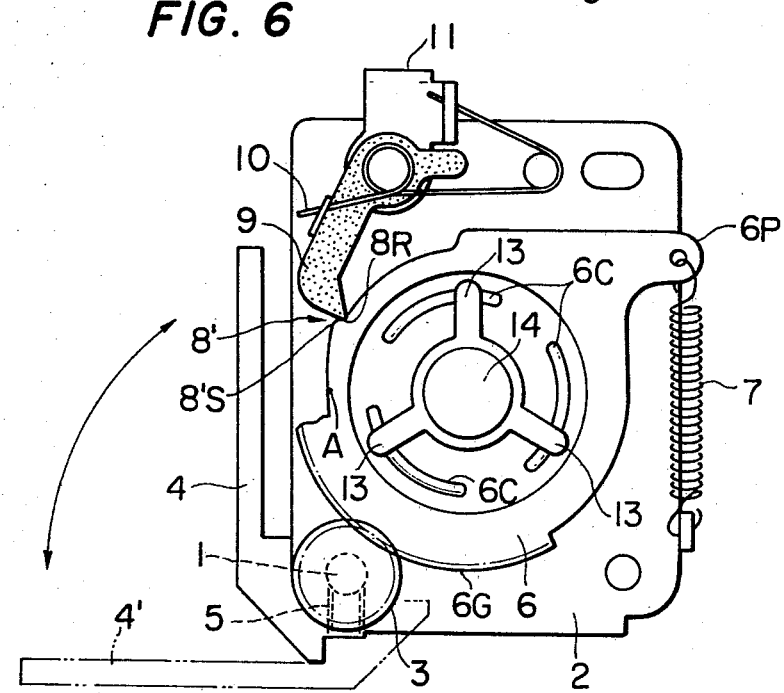

DEVICE FOR OPENING AND CLOSING A SWINGABLY MOUNTED LID

FIELD OF THE INVENTION

This invention generally relates to a device for opening and closing a swingably mounted lid, door or the like of a box, container or rack, such as a rack of a stereophonic reproducing system, and particularly, the present invention relates to a device for smoothly opening and closing such a lid and for securely maintaining the lid at a given position after closed.

BACKGROUND OF THE INVENTION

In order that a lid swingably mounted on a stationary box, container, rack or the like smoothly open and securely close at a given position a mechanism is required. Conventional devices or mechanisms have hitherto used a magnetic device for holding a lid at a given closed position and an air damper has been used for performing smooth opening of a lid. However, since the function of such a magnetic device differs from that of the damper, both of these had to be employed for concurrently performing their functions. Furthermore, such a magnetic device for holding or locking a lid at a given closed position has a drawback in that the lid has to be pulled manually with a force greater than the attracting force of the magnetic device. The air damper for performing smooth opening also has a drawback in that it requires a large space.

SUMMARY OF THE INVENTION

The prsent invention has been developed in order to remove the above-mentioned disadvantages and drawbacks inherent to the conventional opening-closing devices.

It is, therefore, an object of the present invention to provide a single device for opening and closing a swingably mounted lid, with which the lid can be smoothly opened and secured at a given closed position.

A feature of the present invention is to provide such a single device with which a swingably mounted lid can be opened by a simple operation.

Another feature of the present invention is to provide such a single device which is compact.

In accordance with the present invention there is provided a device for opening and closing a swingably mounted lid, comprising; (a) a rotary shaft fixedly connected to the lid at one end of the lid; (b) a first gear fixedly connected to the rotary shaft in such a manner that the first gear rotates as the lid swings; (c) a second gear rotatably mounted on a stationary member, the second gear having a gear teeth portion engaged with the teeth of the first gear, and a ratchet portion having a recess; (d) means for biasing the second gear in such a direction that the lid tends to open; (e) means for braking the second gear; (f) a pawl arranged to engage with the recess of the ratchet wheel portion; and (g) means for biasing the pawl toward the second gear.

BRIEF DESCRIPTION OF THE DRAWINGS

These and other objects and features of the present invention will be more readily apparent from the following detailed description of the preferred embodiments taken in conjunction with the accompanying drawings in which:

FIG. 1 is a side view of a conventional magnetic device utilized for securely closing a lid;

FIG. 2 is a side view of a combination of such a conventional magnetic device and a conventional air damper which is employed for smoothly opening a lid;

FIG. 3 is a schematic side view of a first embodiment of the device according to the present invention;

FIG. 4 is schematic cross-sectional view of the device of FIG. 3 taken along the line IV—IV';

FIG. 5 is a schematic front view of the device of FIG. 3;

FIG. 6 is a schematic side view of a second embodiment of the device according to the present invention.

DETAILED DESCRIPTION OF THE PREFERRED EMBODIMENTS

Figure 7:
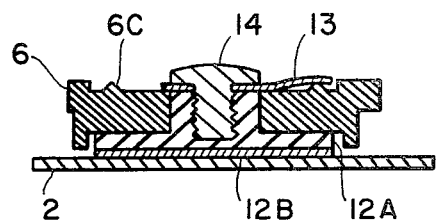
FIGS. 7 and 8 are schematic cross-sectional views showing modifications of FIG. 4.

Prior to describing the embodiments of the present invention, the aforementioned conventional devices will be discussed for a better understanding of the objects and features of the present invention.

FIG. 1 illustrates a conventional device for maintaining a lid at a closed position by means of a magnetic attractive force. The device of FIG. 1 has a structure in which an attracting member "c" made of a magnetic material is attached to the inner surface of a lid "b" at one end portion thereof, the lid "b" being swingably mounted on a container "e" by means of a rotary shaft "a" at the other end thereof, while a magnet "d" is attached to an edge portion of the container "e".

However, this conventional device has a drawback in that the lid "b" has to be opened by hand until the lid "b" is released from the attracting force between the magnet "d" and the attracting member "c" when it is intended to open the lid "b". Furthermore, after release from the attracting force, the lid "b" is in unstable condition because the rotation of the lid becomes suddenly free. Therefore, it is difficult to open the lid smoothly.

Apart from the above-mentioned device, there is another conventional device in which an air damper "f" is used for performing smooth opening-closing operations of a lid "b" as shown in FIG. 2. However, the damper "f" requires a considerably large space, while the effect of the air damper appears only after a user's hand is removed from the lid "b" when opening the same so that the visual effect of the damper is not immediately apparent. In addition, even if such an air damper "f" is utilized, means for stationarily holding the lid, such as magnetic attracting means "c" and "d", is required completely to close the lid "b".

This invention has been developed in order to remove the above mentioned drawbacks of conventional devices, and the present invention will be described with reference to preferred embodiments.

Hence, reference is now made to FIGS. 3 to 5 which show a side view, a cross-sectional view and a front view of a first embodiment of the device according to the present invention. A reference numeral 1 designates a rotary shaft rotatably mounted on a foundation 2, i.e. a stationary member, which is fixedly connected to a container, box, rack or the like (not shown). A lid 4 of the container is fixed to the rotary shaft 1 so that the lid 4 is swingable in the direction of the arrowed curve of FIG. 3, pivoting the rotary shaft 1. Namely, the rotary shaft 1 functions as a hinge. The lid 4 is fixed to the rotary shaft 1 by means of a screw or screws (not shown) embedded in a through-hole 5 or through-holes made in the lid 4. The through-hole(s) 5 is internally threaded to interlock with the screw(s) so that the screw or screws may be tightened when intended to fix the lid 4 to the rotary shaft 1, and may be loosened when intended to readjust the angle of the lid 4 with respect to the container as will be described hereinlater.

A first gear 3 is fixed to the rotary shaft 1 in such a manner that the first gear 3 rotates as the rotary shaft 1 rotates. In other words, the rotation of the first gear 3 causes the lid 4 to swing. A second gear 6 is rotatably mounted on the foundation 2, and comprises a gear teeth portion 6G, at a portion of the periphery thereof, which engages with the first gear 3. The diameter of the second gear 6 is greater than that of the first gear 3, and is arranged to rotate for a given angle without turning fully once when the lid 4 swings open fully from the closed position.

A helical spring 7 is provided between the foundation 2 and the second gear 6 for biasing the second gear 6 in such a direction that the lid 4 tends to open. In detail, one end of the helical spring 7 is connected to a projecting portion 6P, which is integrally formed with the second gear 6, to pull the second gear 6 in the clockwise direction when viewed from the right side as illustrated in FIG. 3. A recess 8R or a stepped portion is made at a portion of the periphery of the second gear 6 for receiving a pawl 9 pivotally mounted on the foundation 2 in the vicinity of the second gear 6. This portion at which the above-mentioned recess 8R is made, may be referred to as a ratchet portion 8 since the second gear 6 is prevented from rotating when the tip portion of the pawl 9 is engaged with the recess 8R. The recess 8R is defined by a shoulder portion 8S which projects radially. The pawl 9 is biased by means of a torsion spring 10 toward the second gear 6, and is operatively connected to a push-button 11. The pawl 9 is arranged to rotate in such a direction that the tip of the pawl 9 disengages from the recess 8R of the ratchet portion 8 when the push-button 11 is depressed. Although, the push-button 11 is shown to be directly connected to the pawl 9 in FIG. 3, the push-button 11 may be provided apart from the pawl 9 if a linkage between these two members is employed. Furthermore, in order to operate the pivotally mounted pawl 9 a suitable member, such as a lever for pulling a portion of the pawl 9 to rotate the same, may be employed in place of the push-button if desired. The push-button 11 or the like may be placed outside the container to be readily manipulated.

The aforementioned screw or screws inserted in the threaded hole(s) 5 is/are tightened when the lid 4 is at the closed position, which is shown by a solid line in FIG. 3, and also when the pawl 9 is engaged with or received in the recess 8R. Accordingly, the second gear 6 is prevented from rotating in the clockwise direction even though the second gear 6 is biased by the force of the helical spring 7. Since the second gear 6 is stationarily maintained or locked at the illustrated angle owing to the pawl 9 received in the recess 8R, the lid 4 is also stationarily fixed or locked at the illustrated closed position.

Figure 8:
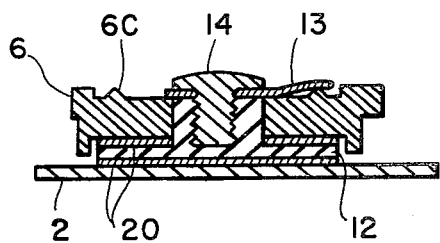

Between the foundation 2 and the second gear 6 is interposed is a brake member 12 or disk (see FIGS. 4 and 5). The brake member 12 is made of a synthetic resin. However, other materials, such as a sheet made of felt, may be used as the brake member 12. If desired, both a synthetic resin sheet 12A and a feltsheet 12B may be used to constitute the brake member 12 as shown in FIG. 7. A viscous material 20 such as grease may be interposed between the foundation 2 and the brake member 12 and/or between the brake member 12 and the second gear 6 if desired, as shown in FIG. 8. Namely, the brake member 12 may be fixedly connected to either the foundation 2 or the second gear, and in this case the viscous material may be interposed between two of the above-mentioned three members 2, 12 and 6. If desired, however, the brake member 12 need not necessarily be fixed to either the foundation 2 or to the second gear 6, and in this case, the viscous material may be attached to the both sides of the brake member 12.

The second gear 6 is rotatably mounted on the foundation 2 by means of a bolt 14 or the like. Namely, the bolt 14 serves as a shaft of the second gear 6. In the illustrated embodiment of FIG. 3, the brake member 12 made of a synthetic resin fixedly attached to the foundation 2, and has an internally threaded hole for receiving the bolt 14 therein. A through-hole is made at the center of the second gear 6 so that the bolt 14 penetrates the same. On the other hand, when a sheet of felt or the like is used in place of such a solid brake member, or when the brake member 12 is not fixed to the foundation 2, the bolt 14 may be fastened by means of a screw provided at the back side of the foundation 2. A leaf spring 13 having three arms is mounted on the upper surface of the second gear 6, and is pressed down by the head of the bolt 14 toward the foundation 2. Each tip portion of the three arms of the leaf spring 13 is in contact with one of a plurality of convex portions 6C formed on the upper surface of the second gear 6. As a result, the entire second gear 6 is biased toward the foundation 2. Therefore, the brake member 12 interposed between the foundation 2 and the second gear 6 is compressively sandwiched therebetween. With this arrangement, a suitable braking force is applied to the second gear 6 during the rotation of the same because of the friction between the foundation 2 and the brake member 12 and/or between the brake member 12 and the second gear 6. The material for the brake member 12 may be suitably selected so that a desirable braking force will be obtained. When a viscous material is additionally employed as described in the above, the viscosity thereof may be suitably selected to obtain a desirable braking force.

Although, in the above-described embodiment, a solid brake member 12 is utilized for obtaining a braking force, such a solid member 12 may be omitted if a viscous material, such as grease, is simply sandwiched between the foundation 2 and the second gear 6 for obtaining a similar result.

The first embodiment device for opening and closing the swingably mounted lid 4 according to the present invention operates as follows: When the user of the container or the like having the lid 4 intends to swing open the lid 4, he or she depresses the push-button 11 to cause the pawl 9 to disengage from the recess 8R of the ratchet portion 8 of the second gear 6. As a result, the second gear 6 turns clockwisely because of the tensile force of the helical spring 7. As the second gear 6 rotates, the first gear 3 engaged therewith also rotates so that the lid 4 swings open from the closed position illustrated by the solid line in FIG. 3 to a fully opened position indicated by a dot-dash line. The lid 4 at the fully opened position is designated at a reference numeral 4'. Although, the second gear 6 is biased by the helical spring 7 in the direction that the lid 4 tends to open, the lid 4 does not suddenly or rapidly swing open since the aforementioned braking force is applied to the second gear during the rotation of the same. Namely, the lid 4 swings slowly at a desired speed where the swinging speed may be selected by changing the value of the braking force which is defined by the structure of the brake member 12 and the material thereof and by the viscosity of the viscous material if used. In addition to the tensile force of the helical spring 7, another force owing to the weight of the lid 4 per se may work on the lid 4 to make the lid 4 swing open when the lid 4 is installed as illustrated.

A suitable stopper (not shown) may be provided to prevent the lid 4 from excessively swinging open beyond a desired fully opened position. Such a stopper may be arranged to abut against either the second gear 6 or the lid 4.

After the lid 4 is completely swung open, when the user intends to close the lid 4, he or she applies a returning force to the lid 4. Namely, the lid 4 may be simply pushed toward the container manually. As the lid 4 closes, the first gear 3 rotates and thus the second gear 6 is turned against the force of the helical spring 7. It will be understood from the above description, that the tip portion of the pawl 9 is on point "A" on the periphery of the second gear when the lid 4 has been fully opened. As the second gear 6 keeps rotating counterclockwise, the tip portion of the pawl 9 finally runs on the shoulder 8S of the ratchet portion 8 to fall in the recess 8R. Thus the pawl 9 engages with the recess 8R again so that the second gear 6 is locked. Consequently, the lid 4 does not swing open even though the second gear 6 is continuously biased by the force of the helical spring 7. Here, it is to be noted that the second gear is maintained at the locked position inasmuch as the second gear is biased clockwisely to cause the ratchet portion 8 to engage with the pawl 9 at the same position. This means that the lid 4 is always kept at the same position whenever the lid 4 is closed.

As described hereinabove, the lid 4 is fixed to the rotary shaft 1 by means of a screw or screws. Therefore, the completely closed position of the lid 4 can be readily adjusted by tightening the screw(s) when the second gear 6 is locked. Therefore, the second gear 6 is securely locked when the lid 4 has been completely closed. Since the positioning control can be readily performed by means of the screw(s) at any time, such a positioning control may be effected after the device is installed in a container, and thus the desirable closing position defined by the corresponding container may be simply adjusted.

Reference is now made to FIG. 6 which shows a schematic side view of a second embodiment of the device according to the present invention. The second embodiment is the same in construction as the first embodiment except for the shape of the ratchet portion. Namely, as illustrated in FIG. 6, the ratchet portion 8' of the second embodiment comprises a concavely curved recess 8'R. In other words, the shoulder portion 8S of FIG. 3 is rounded. This rounded shoulder portion is designated at a reference 8'R. With this structure the pawl 9 easily disengages from the recess 8'R so that the lid 4 can be swung open by either depressing the push-button 11 or pulling the lid 4 per se to start the lid 4 opening. In order to pull the lid 4 at the beginning a suitable nob (not shown) may be attached to the outer surface of the lid 4. If desired, the push-button 11 may be omitted in this second embodiment because the second gear 6 may be easily unlocked without manipulating the pawl 9.

From the foregoing, it will be understood that the present invention has provided a simple device for opening and closing a swingably mounted lid. With the provision of the device, a lid opening operation may be smoothly performed, and the lid can be securely maintained at a given closing position. In addition, an accurate positioning of the lid is effected by simply retightening the screw. Furthermore, all of the parts constructing the device are aligned in substantially the same plane to provide a compact opening and closing device. Since the device according to the present invention does not occupy a large space, the device may be applied to various sorts of containers, boxes, racks or the like.

The above-described embodiments are just examples of the invention, and therefore, it will be apparent for those skilled in the art that many modifications and variations may be made without departing from the spirit of the present invention.

What is claimed is:

1. A device for opening and closing a swingably mounted lid, comprising;
    (a) a rotary shaft fixedly connected to said lid at one end of said lid;
    (b) a first gear fixedly connected to said rotary shaft in such a manner that said first gear rotates as said lid swings;
    (c) a second gear rotatably mounted on a stationary member, said second gear having a gear teeth portion engaged with the teeth of said first gear, and a ratchet portion having a recess;
    (d) means for biasing said second gear in such a direction that said lid tends to open;
    (e) means for braking said second gear;
    (f) a pawl arranged to engage with said recess of said ratchet portion; and
    (g) means for biasing said pawl toward said second gear.

2. A device for opening and closing a swingably mounted lid, as claimed in claim 1, further comprising, means for disengaging said pawl from said recess of said ratchet portion.

3. A device for opening and closing a singably mounted lid, as claimed in claim 1 or 2, wherein said rotary shaft is connected to said lid by means of a screw or screws.

4. A device for opening and closing a swingably mounted lid, as claimed in claim 1 or 2, wherein said means for biasing said second gear is a helical spring connected to said stationary member at its one end.

5. A device for opening and closing a swingably mounted lid, as claimed in claim 1 or 2, wherein said means for braking said second gear comprises a disk-like member interposed between said stationary member and one surface of said second gear, and means for biasing said second gear toward said stationary member.

6. A device for opening and closing a swingably mounted lid, as claimed in claim 5, wherein said disk-like member is a piece of felt.

7. A device for opening and closing a swingably mounted lid, as claimed in claim 5, wherein said disk-like member is a piece of synthetic resin.

8. A device for opening and closing a swingably mounted lid, as claimed in claim 5, wherein said disk-like member comprises a piece of a synthetic resin and a piece of felt attached to one side of said synthetic resin piece.

9. A device for opening and closing a swingably mounted lid, as claimed in claim 5, wherein said disk-like member is fixedly connected to said stationary member.

10. A device for opening and closing a swingably mounted lid, as claimed in claim 5, where said disk-like member is fixedly connected to said second gear.

11. A device for opening and closing a swingably mounted lid, as claimed in claim 5, wherein said disk-like member is movable with respect to said stationary member and to said second gear.

12. A device for opening and closing a swingably mounted lid, as claimed in claim 5, further comprising viscous material interposed between said stationary member and said disk-like member.

13. A device for opening and closing a swingably mounted lid, as claimed in claim 5, further comprising viscous material interposed between said disk-like member and said second gear.

14. A device for opening and closing a swingably mounted lid, as claimed in claim 5, wherein said means for biasing said second gear towards said stationary member comprises a leaf spring operatively connected to the shaft of said second gear.

15. A device for opening and closing a swingably mounted lid, as claimed in claim 1 or 2, wherein said means for braking said second gear comprises a viscous material interposed between said stationary member and one surface of said second gear, and means for biasing said second gear toward said stationary member.

16. A device for opening and closing a swingably mounted lid, as claimed in claim 15, wherein said means for biasing said second gear towards said stationary member comprises a leaf spring operatively connected to the shaft of said second gear.

17. A device for opening and closing a swingably mounted lid, as claimed in claim 1 or 2, wherein said means for biasing said pawl is a torsion spring.

18. A device for opening and closing a swingably mounted lid, as claimed in claim 2, wherein said means for disengaging said pawl comprises a push-button operatively connected to said pawl.

19. A device for opening and closing a swingably mounted lid, as claimed in claim 1 or 2, wherein said recess of said ratchet portion comprises a concavely curved portion so that said pawl disengages from said recess when said lid is swung open.

20. A device as claimed in claim 1 or 2, wherein the positional relationship between said pawl and said recess is selected so that said lid is in its closed state when said pawl engages said recess.

21. A device for opening and closing a swingably mounted lid, comprising:
(a) rotary shaft fixedly connected to said lid at one end of said lid;
(b) a first gear fixedly connected to said rotary shaft in such a manner that said first gear rotates as said lid swings;
(c) a second gear rotatably mounted on a stationary member, said second gear having a gear teeth portion engaged with the teeth of said first gear, and a ratchet portion having a recess, the diameter of said gear teeth portion of said second gear being greater than the diameter of said first gear;
(d) elastic means for biasing said second gear in such a direction that said lid tends to open;
(e) means for braking said second gear;
(f) a pawl arranged to engage with said recess of said ratchet portion and;
(g) means for biasing said pawl toward said second gear.

22. A device as claimed in claim 1 or 21, further comprising means for mounting said second gear on said stationary member, including
bolt means passing through a passage in said second gear and
receiving means for said bolt means and located on said brake means.

23. A device as claimed in claim 22 wherein said receiving means comprises a threaded portion of said brake means.

24. A device as claimed in claim 14 wherein said means for biasing said second gear towards said stationary member further comprises a plurality of projections on said second gear,
said leaf spring including a plurality of arms for engaging said projections.

25. A device as claimed in claim 16 wherein said means for biasing said second gear towards said stationary member further comprises a plurality of projections on said second gear,
said leaf spring including a plurality of arms for engaging said projections.

* * * * *